US011126736B2

(12) United States Patent
Levin et al.

(10) Patent No.: US 11,126,736 B2
(45) Date of Patent: Sep. 21, 2021

(54) PROTECTING STORAGE BY DETECTING UNRECOMMENDED ACCESS

(71) Applicant: Microsoft Technology Licensing, LLC, Redmond, WA (US)

(72) Inventors: Roy Levin, Haifa (IL); Ram Haim Pliskin, Rishon Lezion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 784 days.

(21) Appl. No.: 15/917,989

(22) Filed: Mar. 12, 2018

(65) Prior Publication Data
US 2019/0278922 A1 Sep. 12, 2019

(51) Int. Cl.
G06F 21/60 (2013.01)
H04L 29/06 (2006.01)
G06F 21/62 (2013.01)
G06F 21/55 (2013.01)

(52) U.S. Cl.
CPC .......... *G06F 21/604* (2013.01); *G06F 21/554* (2013.01); *G06F 21/6218* (2013.01); *H04L 63/102* (2013.01); *H04L 63/1408* (2013.01); *H04L 63/1433* (2013.01)

(58) Field of Classification Search
CPC .. G06F 21/604; G06F 21/554; G06F 21/6218; H04L 63/102; H04L 63/1408; H04L 63/1433
USPC .......................................................... 726/25
See application file for complete search history.

(56) References Cited

U.S. PATENT DOCUMENTS

| 9,355,414 | B2 * | 5/2016 | Scholz | G06Q 30/02 |
| 9,479,518 | B1 | 10/2016 | Fang et al. | |
| 9,690,937 | B1 | 6/2017 | Duchin et al. | |
| 9,754,306 | B2 * | 9/2017 | Brown | G06Q 30/0631 |
| 9,911,130 | B1 * | 3/2018 | Battisti | G06Q 30/0631 |

(Continued)

OTHER PUBLICATIONS

Vijayan, Jai, "Cloud Storage the New Favorite Target of Phishing Attacks", retrieved from <<http://www.darkreading.com/attacks-breaches/cloud-storage-the-new-favorite-target-of-phishing-attacks/d/d-id/1328078>>, Feb. 7, 2017, 9 pages.

(Continued)

*Primary Examiner* — Dereena T Cattungal
(74) *Attorney, Agent, or Firm* — Ogilvie Law Firm

(57) ABSTRACT

Described technologies enhance cybersecurity by leveraging collaborative filtering tools and techniques for security use by scoring attempts to access items in digital storage. Examples provided illustrate usage of accessor IDs and storage item IDs to compute recommendation scores which then operate as inverse measures of intrusion risk. Actions taken in response to recommendation scores that fall below a specified threshold may include preventing or terminating access, or alerting an administrator, for instance. A requested access may be allowed when the computed recommendation score is above a specified threshold, which indicates an acceptably low risk that the access is an unauthorized intrusion. Described cybersecurity technologies may be used by, or incorporated within, cloud services, cloud infrastructure, or virtual machines. Described cybersecurity technologies may also be used outside a cloud, e.g., on individual servers or on server clusters or on storage area networks that are not necessarily part of a cloud.

20 Claims, 5 Drawing Sheets

(56) References Cited

U.S. PATENT DOCUMENTS

| | | | |
|---|---|---|---|
| 10,475,100 B1* | 11/2019 | Herz | G06Q 30/0629 |
| 2006/0253580 A1* | 11/2006 | Dixon | H04L 63/145 |
| | | | 709/225 |
| 2009/0271246 A1* | 10/2009 | Alvarez | G06Q 30/02 |
| | | | 705/7.29 |
| 2010/0251128 A1* | 9/2010 | Cordasco | H04L 67/125 |
| | | | 715/736 |
| 2011/0179492 A1 | 7/2011 | Markopoulou et al. | |
| 2011/0184977 A1* | 7/2011 | Du | G06Q 10/10 |
| | | | 707/769 |
| 2013/0254880 A1 | 9/2013 | Alperovitch et al. | |
| 2014/0207506 A1* | 7/2014 | Palmert | G06F 16/2455 |
| | | | 705/7.15 |
| 2014/0304277 A1* | 10/2014 | Veugen | G06F 16/40 |
| | | | 707/748 |
| 2015/0073931 A1* | 3/2015 | Ronen | G06Q 30/0631 |
| | | | 705/26.7 |
| 2015/0195299 A1* | 7/2015 | Zoldi | H04L 63/1408 |
| | | | 726/25 |
| 2015/0261649 A1 | 9/2015 | Boehm et al. | |
| 2015/0286842 A1* | 10/2015 | Mori | G06F 16/23 |
| | | | 726/30 |
| 2016/0284007 A1* | 9/2016 | Sakai | G06Q 30/0631 |
| 2016/0335686 A1* | 11/2016 | AthuluruTlrumala | |
| | | | H04N 21/44222 |
| 2016/0360557 A1 | 12/2016 | Lavi et al. | |
| 2017/0011096 A1* | 1/2017 | Bittmann | G06F 16/2465 |
| 2017/0124593 A1* | 5/2017 | Nickerson | G06Q 30/0263 |
| 2017/0134412 A1* | 5/2017 | Cheng | H04L 67/2842 |
| 2017/0171580 A1* | 6/2017 | Hirsch | H04N 21/6125 |
| 2018/0189693 A1* | 7/2018 | Newhouse | G06Q 10/0631 |
| 2018/0218436 A1* | 8/2018 | Cooper | G06Q 30/0631 |
| 2018/0253661 A1* | 9/2018 | Strauss | G06Q 30/0269 |
| 2019/0080383 A1* | 3/2019 | Garcia Duran | G06F 16/2228 |

OTHER PUBLICATIONS

Bokde, Dheeraj, et al., "Matrix Factorization Model in Collaborative Filtering Algorithms: A Survey", Procedia Computer Science 49 (2015) pp. 136-146.

Nunnally, Troy, et al., "NAVSEC: A Recommender System for 3D Network Security Visualizations", retrieved from <<http://cap.ece.gatech.edu/papers/NAVSEC_9.pdf>>, Oct. 14, 2018, 8 pages.

"Collaborative filtering", retrieved from <<https://en.wikipedia.org/wiki/Collaborative_filtering>>, Jan. 26, 2018, 9 pages.

"Matrix decomposition", retrieved from <<https://en.wikipedia.org/wiki/Matrix_decomposition>>, Jan. 21, 2018, 9 pages.

"Recommender system", retrieved from <<https://en.wikipedia.org/wiki/Recommender_system>>, Jan. 26, 2018, 8 pages.

Sommer, Robin, et al., "Outside the Closed World: On Using Machine Learning for Network Intrusion Detection", retrieved from <<https://www.utdallas.edu/~muratk/courses/dmsec_files/oakland10-ml.pdf>>, 2010, 12 pages.

Panda, MruTyunjaya, "Building Recommender Systems for Network Intrusion Detection Using Intelligent Decision Technologies", retrieved from <<https://www.researchgate.net/publication/262002369_Building_Recommender_Systems_for_Network_Intrusion_Detection_Using_Intelligent_Decision_Technologies>>, Jan. 2013, 17 pages.

Bradford, Contel, "Storage Wars: File vs Block vs Object Storage", retrieved from <<https://www.storagecraft.com/blog/storage-wars-file-block-object-storage/>>, Jan. 30, 2018, 6 pages.

"Storage Analytics", retrieved from <<https://docs.microsoft.com/en-us/azure/storage/common/storage-analytics>>, Mar. 3, 2017, 8 pages.

"International Search Report and Written Opinion Issued in PCT Patent Application No. PCT/US2019/020461", dated May 20, 2019, 13 pages.

* cited by examiner

PROTECTING STORAGE BY DETECTING UNRECOMMENDED ACCESS

BACKGROUND

Cybersecurity tries to reduce or prevent attacks that damage desirable qualities of data and computing resources, such as confidentiality, availability, and integrity. Sometimes a cyberattack is focused on a particular quality, e.g., a distributed denial of service attack is typically focused on eroding or eliminating the availability of data and transactional services. At other times, an attack is directed at multiple qualities, e.g., a man-in-the-middle attack reduces confidentiality, but it may also introduce spurious or modified data, thereby attacking data integrity. Cyberattacks take many forms, including social engineering efforts such as phishing, compute-intensive attacks such as brute force attacks on passwords, open attacks such as adware and ransomware, hidden attacks such as rootkits and data leaks, attacks focused on particular resources such as computing power (creating a zombie army of bots) or storage (hijacking web server storage to hold illegal materials), attacks that target particular kinds of data (e.g., medical histories, credit card data), and many other forms of attack. Accordingly, a wide variety of tools and techniques are useful to detect, deter, prevent, or remediate cyberattacks.

SUMMARY

Some technologies described herein are directed to the technical activity of automatically detecting unauthorized attempts to access items stored in a computing system, thereby reducing the risk of undetected intrusions. Some teachings are directed to protecting storage accounts from cyberattacks by detecting unrecommended access through an adaptation of collaborative filtering for use in cybersecurity. Technical mechanisms are described for assessing intrusion risk based not necessarily on what is considered baseline or normal behavior for a particular system or a particular user, but instead based at least in part on a measure of what accesses are to be expected from multiple accessors to a given storage item. Specific technical tools and techniques are described here in response to the challenge of providing defense-in-depth by way of layered intrusion detection or layered intrusion prevention. Other technical activities pertinent to teachings herein will also become apparent to those of skill in the art.

Some embodiments described herein adapt collaborative filtering from its use in recommendation systems to usage instead for cyberattack intrusion detection. As to the technical adaptations made, rather than operational data and structures representing people and products they might buy, some embodiments operate with accessor IDs and storage item IDs. An accessor ID may be associated with a particular computer system user or with multiple users, and a given user may have multiple associated accessor IDs, e.g., a source IP address and a source port number which serve together as a composite accessor ID. The accessor ID may also be associated with a device or set of devices, such as a particular router interface or a network address range, rather than directly identifying a human user, much less a human consumer who is considering a purchase. The storage item ID identifies a storage item such as a blob or database table, for example, rather than a product that is being offered for purchase. Also, the recommendation score produced by collaborative filtering is not used by a commerce engine as a measure of whether to recommend a product for purchase, but is used instead by a cybersecurity mechanism as a measure of intrusion risk, e.g., as a decision factor in an intrusion detection system or an intrusion prevention system which may include or operate within a multi-layered cybersecurity system or process.

Some embodiments described herein include a collection of scored-tuples, residing in a digital memory. Each scored-tuple includes at least one accessor ID and a storage item ID and a recommendation score corresponding to a storage access attempt. A tuple-to-score in the memory includes at least one accessor ID and a storage item ID, and a space to hold a recommendation score which has not yet been assigned to the tuple-to-score. A recommender executed by a processor collaboratively filters a plurality of the scored-tuples, thereby computing a recommendation score usable as an inverse measure of intrusion risk. The measure is inverse in that as the recommendation score decreases, intrusion risk increases, and vice versa. The recommendation score is assigned to the tuple-to-score, which may then be used in future scoring iterations as a scored-tuple.

Some embodiments automatically form a tuple-to-score, in response to an attempt by a user to access a storage item. The tuple-to-score includes an accessor ID (which may be a composite of accessor IDs) and a storage item ID. The accessor ID is associated with the user, and the storage item ID identifies the storage item relative to other storage items. The embodiment automatically computes a recommendation score at least in part by collaboratively filtering a plurality of scored-tuples. Each scored-tuple includes (a) an accessor ID which differs from the accessor ID of the tuple-to-score, (b) a storage item ID which matches the storage item ID of the tuple-to-score, and (c) a recommendation score corresponding to the scored-tuple's accessor ID and storage item ID.

Some embodiments automatically take one or more actions based at least in part on the computed recommendation score, thereby using the recommendation score as an inverse measure of intrusion risk. Some embodiments prevent or terminate access to the storage item by the user when the computed recommendation score is lower than a specified access-prevention threshold, as part of an intrusion prevention (also sometimes known as an "active intrusion detection"). Some embodiments alert an administrator or a security monitoring task to the access to the storage item by the user when the computed recommendation score is lower than a specified access-alert threshold. Some embodiments allow the user to access the storage item when the computed recommendation score is above a specified access-allowable threshold; in this context, not actively preventing or terminating access or alerting is considered an affirmative action, namely, the withholding of preventing or terminating or alerting based on a measure of intrusion risk.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
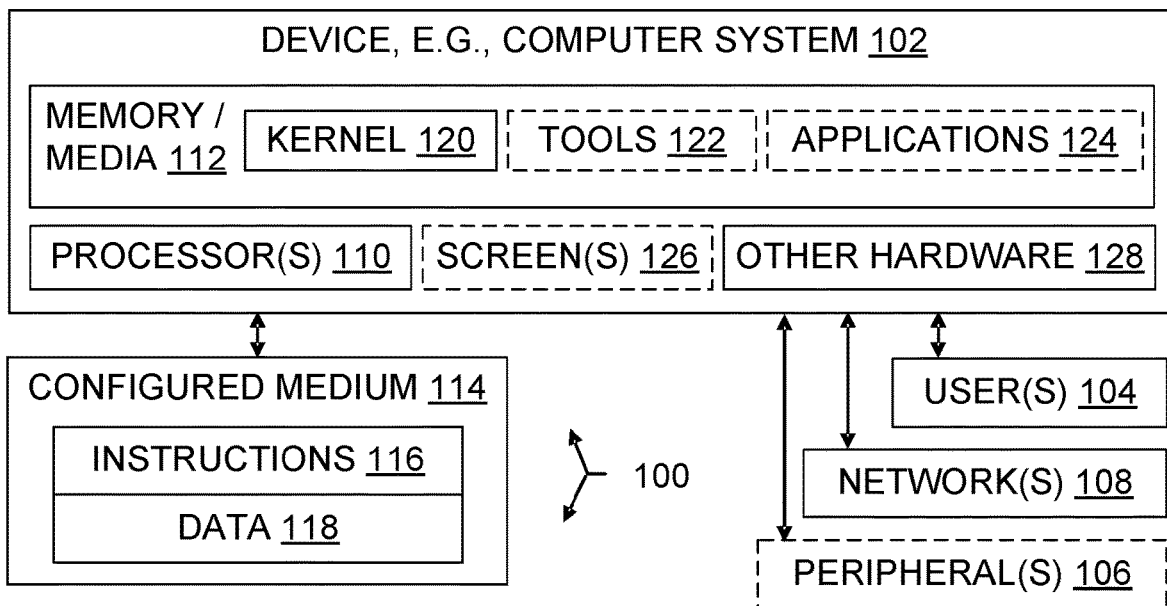
FIG. 1 is a block diagram illustrating a computer system and also illustrating a configured storage medium.

Some cyberattacks can be detected as unauthorized operations done to an item in storage, and in particular, as unauthorized attempts to access an item in a cloud storage context. Unauthorized storage access may have a goal such as data exfiltration, or changing source code to add malware or a backdoor when the code is stored in cloud storage, or aiding ransomware by encrypting stored data, or exploiting a cloud storage customer's storage account to gain free storage space for the attacker. One way to gain access to someone else's storage account is by using social engineering techniques like phishing or by using a storage key that has unintentionally been leaked by an account owner. Hence, one challenge of storage security is to recognize suspicious activity in an account even when the activity is apparently being done by a legitimate user of the account.

Another challenge is detecting cyberattacks against cloud storage accounts which are relatively new. Some familiar solutions look for specific attack types such as ransomware attacks, but do not detect other kinds of attacks such as malware insertion, backdoor insertion, or unauthorized storage of data. Detection tools tailored to detect a specific type of attack often involve either using a set of rules that are too rigid for easy application in varied circumstances or using a supervised machine learning model which requires labels that are very difficult and tedious to obtain. Other familiar solutions employ generic anomaly detection techniques which try to find behavior that is out-of-the-ordinary for a machine, presuming that such behavior may indicate a security risk. But this approach often relies on the history of a specific machine, which may not be rich and not be representative enough to generalize from. Hence, such a detection tool can yield too many false alarms to be efficient in practice.

In response to such challenges, some embodiments described here use an adaptation of collaborative filtering to help detect unauthorized accesses to storage, whether that is cloud storage or more localized storage such as hybrid storage or entirely on-premises storage. Collaborative filtering has familiar uses in recommendation systems, such as those which recommend, to a particular consumer, a movie to watch or a product to buy. The recommendation is based on the actions of other consumers. The recommendation system works by using existing ratings (either implicit or explicit) that have been given by users to products, in order to predict ratings of unrated products. Collaborative filtering in the familiar context of a commerce site assumes that when a particular consumer agreed with the other consumers about other movies or products, the consumer is likely to also agree with them about a particular movie or product the consumer is considering.

Collaborative filtering is adapted by teachings herein to help protect storage accounts from cyberattacks by detecting unrecommended access. Adaptations described herein calculate a recommendation score (a.k.a. rating) for access to a storage account. This score can be calculated based on existing scores, which may be implicit ratings. When the recommendation score of a new operation on a storage account is relatively very low, the adaptation considers that low-scored operation to be an anomaly which is a potential security risk.

This adapted solution works by modeling stored files or other stored items as if they were products, and by using properties extracted from the storage access operation (e.g., IP address, username, user agent, etc.) as if they were users. Then this adaptation builds and uses a collaborative filtering based approach between the quasi-users (the access properties) and quasi-products (the accessible storage items) to recommend new (i.e., unrated) items for accessors. This collaborative filtering can be done by building a sparse matrix of accessor IDs and storage item IDs, for example. Borrowed techniques such as matrix factorization are then applied to calculate missing values (recommendation scores) in this sparse matrix. Low scores are used as an indication that the specific interaction is not likely to be indicative of normal behavior, hence the recommendation score produced by the adapted collaborative filter can be used to detect cyberattacks in a storage account.

Some embodiments use the recommendation scoring techniques that are used for products and purchase recommendations, but the techniques are adapted to the data and post-scoring action context of intrusion detection. This approach works better than familiar intrusion detection mechanisms discussed above because the data used to calculate the anomaly score of an event is not based merely on a particular history but also on specified related histories as well. The particular embodiments presented here go well beyond a mere observation that collaborative filtering can be used to solve different problems than the problem of how to increase sales at a commerce site. The embodiments describe and expressly claim some specific adaptations which make that initial observation implementable in practical terms for intrusion detection. The adaptations are something more than a mere idea, and they merit close attention in their own right.

Nonetheless, some embodiments described herein may be viewed by some people in a broader context. For instance, concepts such as collaboration, filtering, intrusion, recommendations, risk, and scoring, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to detect cyber intrusions using data that is too scarce or too sparse to operate effectively as a machine learning training set for anomaly detection. Other media, systems, and methods involving collaboration, filtering, intrusion, recommendations, risk, or scoring are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Some embodiments address technical activities that are rooted in computing technology and improve the functioning of computing systems by helping secure those systems. For instance, some embodiments help detect an unauthorized storage access even when the user performing the access has been authenticated and no file system or access control list permissions are being violated by the access. Some activities of embodiments support the detection of anomalous accesses that may be a symptom of unauthorized or abnormal use of processing hardware. Some support the identification of particular accessors or access paths as anomalous, to a specified degree which is captured in the form of a recommendation score, which is an inverse measure of risk.

Some embodiments include technical components such as computing hardware which interacts with software in a manner beyond the typical interactions within a general purpose computer. For example, in addition to normal interaction such as memory allocation in general, memory reads and writes in general, instruction execution in general, and some sort of I/O, some embodiments described herein implement intrusion detection or intrusion prevention steps disclosed herein.

Technical effects provided by some embodiments include more efficient detection of security attacks based on scarce or sparse access data, and more cost-effective security through leveraging existing code libraries for matrix factorization, singular value decomposition, or principal component analysis.

Some embodiments include technical adaptations such as accessor IDs and storage item IDs employed (from the perspective of a collaborative filter) in the roles of user and product, and collaborative filtering recommendation scores employed (from a security administrator or software design perspective) as inverse measures of intrusion risk.

Other advantages based on the technical characteristics of the teachings will also be apparent to one of skill from the description provided.

Acronyms and Abbreviations

Some acronyms and abbreviations are defined below. Others may be defined elsewhere herein or require no definition to be understood by one of skill.

ACL: access control list
ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
IDE: integrated development environment, sometimes also called "interactive development environment"
IDS: intrusion detection system (host-based or network-based)
IP: internet protocol
IPS: intrusion prevention system (host-based or network-based)
MAC: media access control
NIC: network interface card
OS: operating system
RAM: random access memory
ROM: read only memory
TCP: transmission control protocol
UDP: user datagram protocol
URL: uniform resource locator
VM: virtual machine Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network environment.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring. IoT storage may be a target of unauthorized access, either via a cloud, via another network, or via direct local access attempts.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as obtaining accessor IDs and storage item IDs from data logs, packet analyzers, routing caches, proxy caches, or other representations of thousands of communications (which may be sessions or packets, for example), and collaboratively filtering relevant accessor IDs and storage item IDs and recommendation scores fast enough to prevent intrusions without bringing authorized accesses to an unacceptable crawl, are understood herein as requiring and providing speed and accuracy that are not obtainable by human mental steps, in addition to their inherently digital nature (a human mind cannot interface directly with RAM or other digital storage to retrieve the necessary data). This is well understood by persons of skill in the art, but others may sometimes need to be informed or reminded of the facts. Unless stated otherwise, embodiments are presumed to be capable of operating at scale in production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

An "on-premises network" is a network on the premises of a particular entity and owned by that entity, and a "cloud network" is a network accessible through the internet which is owned by a cloud service provider and which provides compute, storage, and network capabilities to multiple entities.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, alerting, allowing, analyzing, assigning, collaboratively filtering, communicating, comparing, computing, decomposing, detecting, factoring, forming, identifying, matching, operating, performing, preventing, receiving, scoring, storing, taking action, terminating, using (and accesses, accessed, alerts, alerted, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as computational system or computing system 104 users 106 peripherals 108 network generally 110 processor 112 computer-readable storage medium, e.g., RAM, hard disks 114 removable configured computer-readable storage medium 116 instructions executable with processor; may be on removable media or in other memory (volatile or non-volatile or both)

118 data 120 kernel(s), e.g., operating system(s), BIOS, device drivers 122 tools, e.g., anti-virus software, firewalls, packet sniffer software, intrusion detection systems (IDS), intrusion prevention systems (IPS)

124 applications, e.g., word processors, web browsers, spreadsheets 126 display screens 128 computing hardware not otherwise associated with a reference number 106, 108, 110, 112, 114

Figure 3:
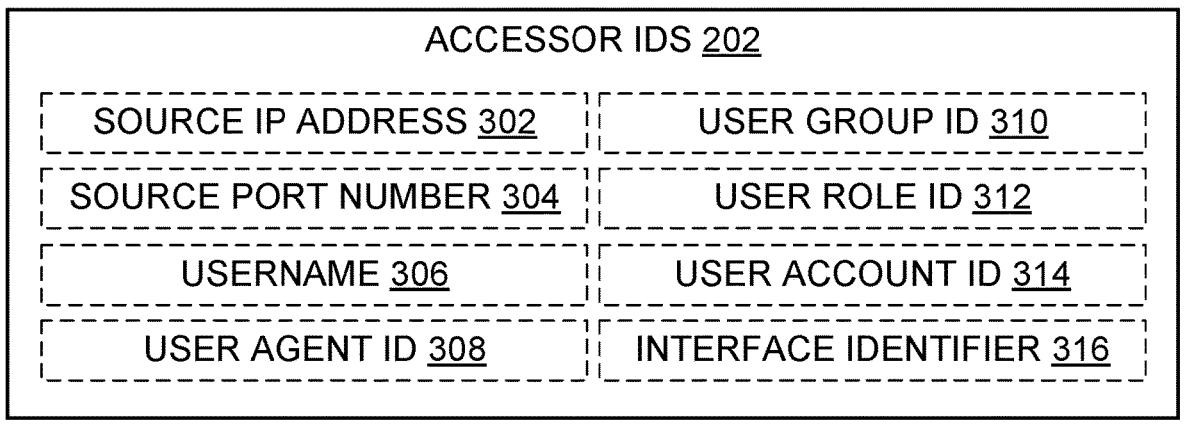
FIG. 3 is a block diagram illustrating storage accessor IDs.
Figure 4:
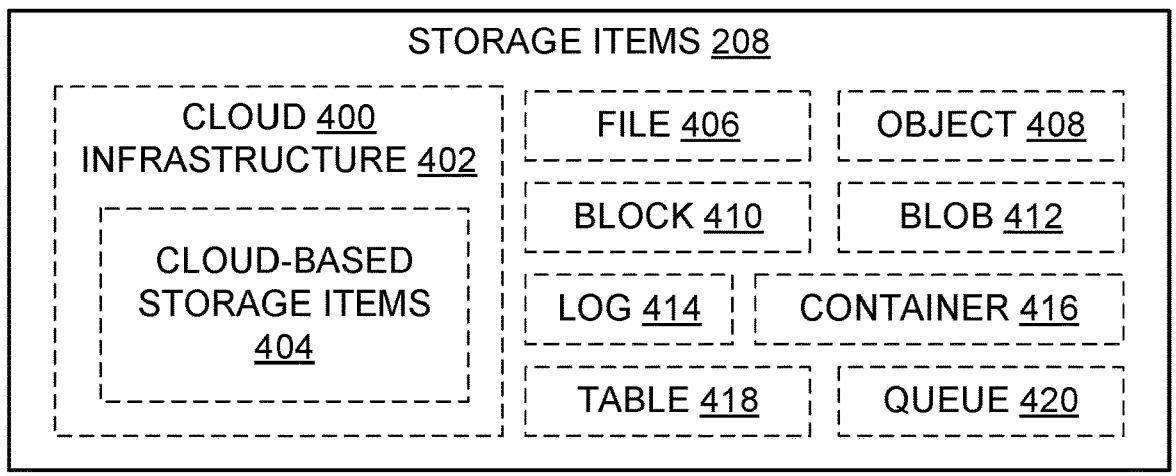
FIG. 4 is a block diagram illustrating storage items.

200 accessors; an accessor may be an individual user, e.g., user with username FooBarBob, or a collection of users, e.g., everyone sending packets from a specified range of network addresses or a through a specified proxy or from a specified IP address 202 accessor ID (see FIG. 3 for examples); may be a composite of two or more accessor IDs 204 access request; may be, e.g., in the form of a packet, a procedure call, a method invocation, an interrupt, a signal, or another form 206 storage, namely digital storage; may be volatile or non-volatile, RAM, ROM, disk, tape, flash, or other medium 208 storage items (see FIG. 4 for examples)

210 storage item ID, e.g., filename, GUID (globally unique identifier), handle, URL (full or relative path), address, or other identifier 212 permissions, e.g., file system permissions, or an ACL (access control list)

302 source IP address 304 source port number, e.g., in a TCP segment or UDP datagram 306 username 308 user agent ID 310 user group ID, e.g., workgroup ID 312 user role ID, e.g., role in a role-based access control environment 314 user account ID, e.g., account number 316 interface identifier, e.g., MAC or IP address of a network interface 400 cloud, e.g., private cloud, public cloud, hybrid cloud, community cloud; a storage environment which provides scalability, elasticity, resource pooling, and a measured storage service 402 cloud infrastructure, e.g., APIs for allocating, deploying, or accessing cloud storage or other cloud resources such as computing or network resources; may include hypervisors or other kernels 404 cloud-based storage items, e.g., storage accessed through a cloud API 406 file 408 object (in the object-oriented programming sense)

410 block (of storage)

412 blob (binary large object)

414 log 416 container 418 table, especially in a relational or other database 420 queue 500 system configured with collaborative filtering adaptation for cybersecurity 502 scored-tuple, namely, a tuple including an accessor ID, a storage item ID, and a recommendation score (or an equivalent such as a risk intrusion score)

504 recommendation score 506 tuple-to-score, namely, a tuple including an accessor ID, a storage item ID, and with a space for a recommendation score (or equivalent such as a risk intrusion score with corresponding inversion) that has not yet been assigned 508 space for a recommendation score (or equivalent such as a risk intrusion score with corresponding inversion) that has not yet been assigned 510 recommender (software operating in conjunction with supporting hardware)

512 collaborative filtering code 514 sparse matrix used in some implementations of collaborative filtering 516 cloud services generally 518 virtual machines generally 602 average recommendation score 604 unrecommended access (due to recommendation score below threshold, or equivalent risk intrusion score above threshold)

702 queue storage service 704 database (relational or otherwise)

706 database service 708 blob storage service 710 file storage service 712 block storage service 714 request to access storage; may be a read request, write request, movement request, permission change request, or any other request which changes the data stored or the circumstances required or permitted for accessing that data, or both 800 cybersecurity methods (one flowchart may be traversed in different ways, so one flowchart represents multiple methods in that sense)

802 detecting an attempt to access a storage item 804 accessing a storage item 806 forming a tuple 808 computing a recommendation score 810 performing collaborative filtering to compute a recommendation score 812 taking an action based on a recommendation score 814 action which may be taken based on a recommendation score 816 preventing an access, e.g., denying access, stalling, killing a connection 818 terminating an access that has already commenced 820 alerting a human or a software process or both, e.g., by text, email, visible alert, signal, or other alert transmission 822 allowing an access 900 flowchart 902 identifying a user: either fully identifying a particular user, or partially identifying user by narrowing down the set of possible users, e.g., to a particular department or workgroup or external network 904 identifying a storage item: either fully identifying a particular storage item, or partially identifying a storage item by narrowing down the set of possible storage items, e.g., to a particular directory subtree or file system volume or list of items 906 performing a memory-based collaborative filtering 908 memory-based collaborative filtering 910 performing a model-based collaborative filtering 912 model-based collaborative filtering 914 performing a matrix factorization as part of collaborative filtering 916 matrix factorization 918 performing a singular value decomposition as part of collaborative filtering 920 singular value decomposition 922 performing a principal component analysis as part of collaborative filtering 924 principal component analysis 926 performing a probabilistic matrix factorization as part of collaborative filtering 928 probabilistic matrix factorization 930 performing a non-negative matrix factorization as part of collaborative filtering 932 non-negative matrix factorization 934 compare recommendation score to threshold, e.g., to determine whether recommendation score is low (below, e.g., 0.3 on scale from 0.0 to 1.0), very low (below, e.g., 0.2), or extremely how (e.g., below 0.1); these thresholds are merely examples, and other values and a different number of value ranges may be used in a given implementation

936 recommendation score threshold (or equivalently, intrusion risk threshold with inversion, e.g., suspicious access is above 0.85 and likely intrusion is above 0.92 on a scale of 0.0 to 1.0) these thresholds are merely examples, and other values and a different number of value ranges may be used in a given implementation

938 communicating with other components of an environment

940 components of an environment other than the recommender 510, e.g., an administrative dashboard component or a logging component

942 operating in a cloud

944 using a recommendation score as an intrusion risk measure

946 intrusion risk measure

948 using a recommendation score together with other intrusion risk measures, e.g., together with a conventional intrusion detection system or conventional intrusion prevention system in a layered defense against cyberattacks

950 receive a request to access storage

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, software developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Storage Environments

With reference to FIGS. 2 through 7, an operating environment 100 may overlap or include one or more storage environments, such as a local environment or a remote environment. Some embodiments operate 942 in a cloud 400, while others do not involve a cloud.

Figure 2:
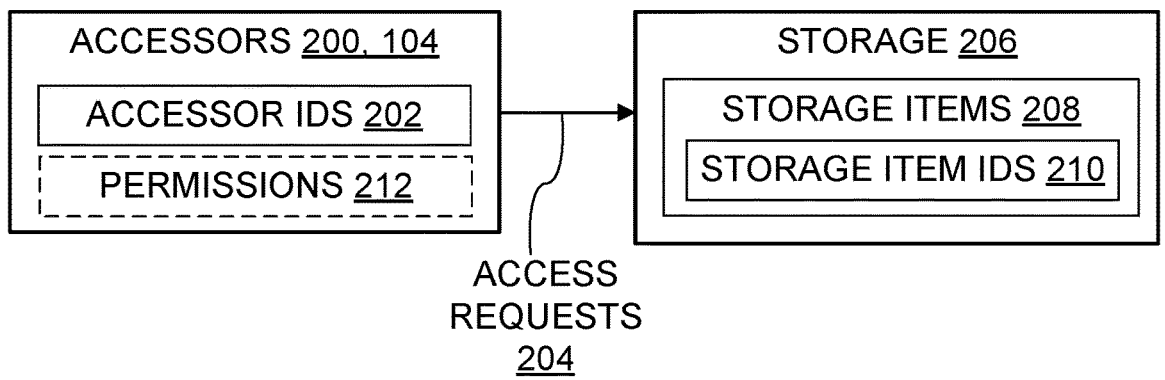
FIG. 2 is a block diagram illustrating aspects of accesses to storage.

As illustrated in FIG. 2, an accessor 200 includes or is associated with one or more users 104. The accessor 200 has one or more accessor IDs 202. For example, an individual user may have accessor IDs that include a username 306 or user account number 314, which is used for multiple accesses, and may be attempting a particular access with a request 204 that originates from an application program 124 that is using a particular source IP address 302 and source port 304. As another example, an accessor 200 may be a program, such as a file transfer program, which authenticated anonymously (no username, or generic username such as "guest") but nonetheless sends the access request 204 using a particular source IP address 302 and source port 304. The access request 204 seeks access to one or more items 208 in storage 206, and includes a storage item ID 210 to identify the item(s) for which access is requested. Permissions 212 may be associated with the accessor (e.g., a token), with the storage item (e.g., an ACL or file system permission), or both.

FIG. 3 illustrates examples of accessor IDs 202. An "accessor ID" is a characteristic, property, attribute, or other value associated with a user, device, or other entity that is seeking access to a storage item, which value fully or partially identifies that entity relative to other entities that have accessed the storage item or have the technological capability to attempt to access the storage item. Illustrated examples of accessor IDs 202 include a source IP address 302, source port number 304 for TCP or UDP or another transport protocol, alphanumeric username 306, user agent ID 308, user group ID 310, user role ID 312, internal user account ID 314, or network interface identifier 316 such as an IP address or MAC address.

FIG. 4 illustrates examples of storage items 208. A "storage item" is a unit of storage allocation identified in an access request from an accessor. Individual bits and bytes are storage, but in most computing systems they cannot be individually allocated, so they are not units of storage allocation and hence they are not—individually—storage items. It is expected that many, perhaps most, storage items will be logical or virtual as opposed to a physical cluster or sectors; they will be defined at a level that is visible to end users 104 as individual items, e.g., as a file 406 or blob 412 or table 418. Illustrated examples of storage items 208 include files 406, objects 408, blocks 410, blobs 412, logs 414, containers 416, tables 418, and queues 420. It is expected that in many environments of interest, storage items 208 will be located in a cloud 400 as cloud-based storage items 404, 208 which are allocated by a cloud service 516 using infrastructure 402. In a given situation, the infrastructure 402 may provide redundancy through parity, replication, or other mechanisms, and may provide access efficiencies through load balancing or decisions about which devices actually hold the stored data, for example. The infrastructure 402 also maps between physical storage devices and the logical view of a storage item that is presented to users.

Figure 5:
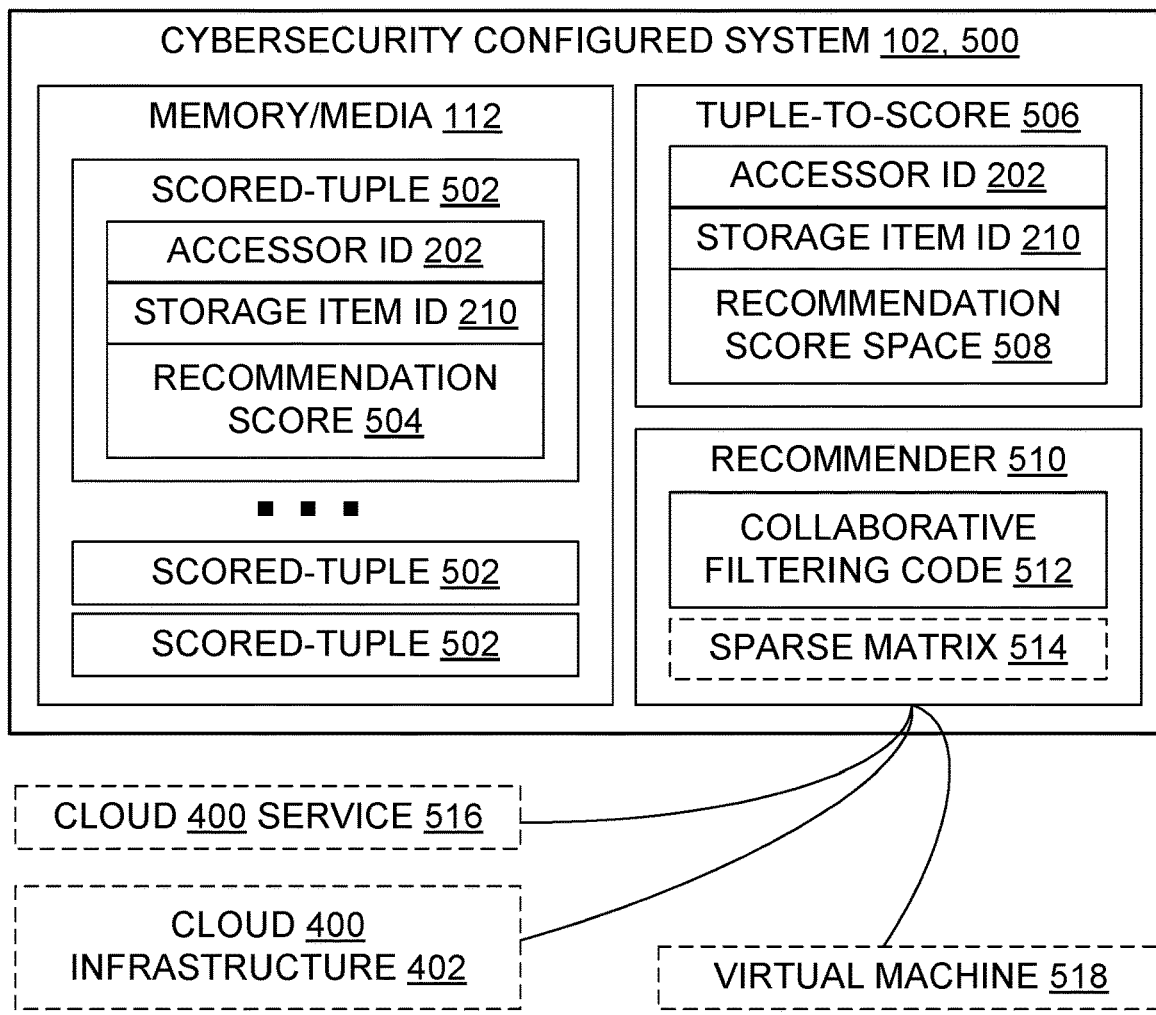
FIG. 5 is a block diagram illustrating aspects of a system configured for cybersecurity using a collaborative filtering adaptation.

FIG. 5 illustrates a system 102 which is configured with cybersecurity enhancements according to some of the teachings herein to provide a cybersecurity configured system 500. A recommender 510 uses collaborative filtering code 512 to produce recommendation scores 504 for respective pairs of accessor IDs 202 and storage item IDs 210. The recommender 510 may reside in or communicate 938 with one or more cloud 400 components 940, e.g., intrusion detection using the recommender 510 may be provided as a service 516 or as part of an infrastructure 402. The recommender 510 may instead or in addition reside in a virtual machine 815, e.g., in a virtual firewall.

Each accessor ID 202, paired storage item ID 210, and respective assigned recommendation score 504 resides in a scored-tuple 502. For at least one accessor ID 202 and paired storage item ID 210, a recommendation score 504 has not yet been assigned, but space 508 for the recommendation score 504 is provided in a tuple-to-score 506 containing the accessor ID 202 and paired storage item ID 210. A given accessor ID 202 may appear in zero or more tuples 502, 506. A given storage item ID 210 may appear in zero or more tuples 502, 506. A given recommendation score 504 may appear in zero or more tuples 502.

Figure 7:
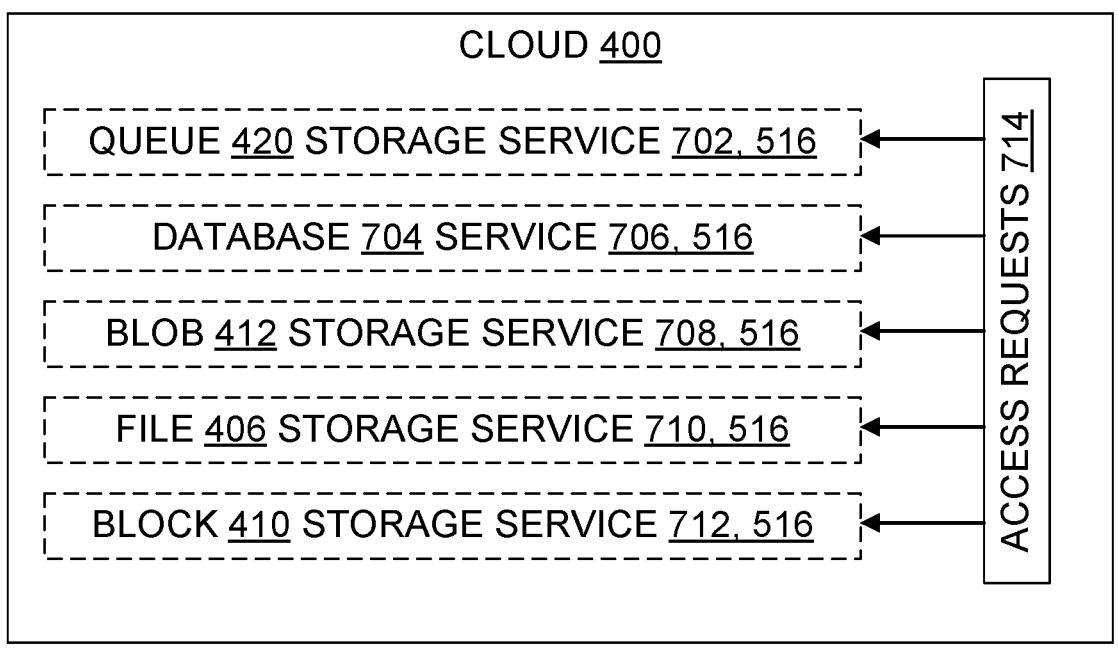
FIG. 7 is a diagram illustrating accesses to example cloud services.

FIG. 7 illustrates some of the many other communication options in a cloud 400. Requests 714 to access storage items 404 may be directed to a cloud service 702 tailored for managing queues 420, a cloud service 706 tailored for managing a database 704, a cloud service 708 tailored for managing blobs 412, a cloud service 710 tailored for managing files 406, a cloud service 712 tailored for managing blocks 410 of storage, or other services 516. These requests 714 may be intercepted and vetted by a cybersecurity system (or subsystem) 500 which contains a recommender 510, based on the recommendation score derived from collaborative filtering on the source of the request and the storage item targeted by the request.

Figure 6:
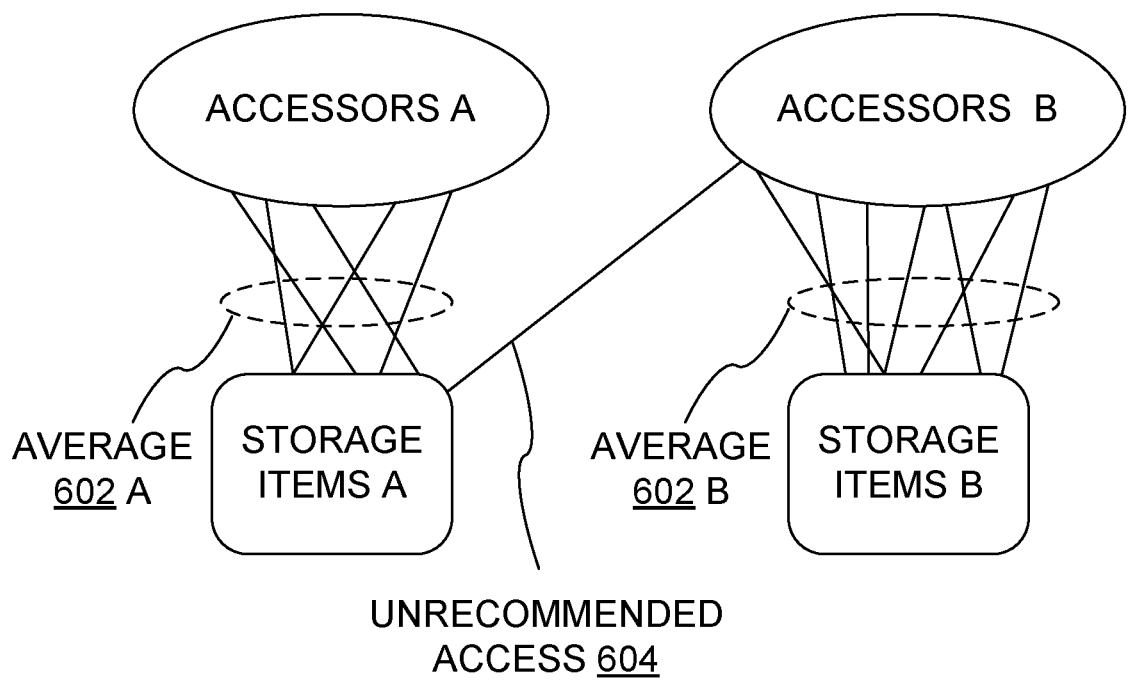
FIG. 6 is a diagram illustrating an example of an unrecommended access in an access context.

FIG. 6 illustrates a particular example of access request vetting. As shown, a first group A of accessors tends to access a first group A of storage items, and a second group B of accessors tends to access a second group B of storage items. Thus the average recommendation scores 602 for the respective sets of accesses (i.e., accessor ID plus paired storage item ID) is above an access-allowed threshold for each group. Equivalently, the average intrusion risk for each respective group of accesses is below a risk threshold, and hence the accesses are deemed unsuspicious and therefore allowed. But a particular access also occurs (or is attempted) from an accessor in group B to a storage item in group A. This access 604 (or attempted access) receives a recommendation score which is low, and hence a high intrusion risk rating. This low-scored access is an example of an unrecommended access, which a cybersecurity system 500 would prevent or terminate, or would at least alert on so that further action can be taken by an administrator.

More About Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

Some embodiments use or provide a cybersecurity configured system 500, with storage item access attempt intrusion risk scoring configured for providing cybersecurity. The system 500 includes at least one processor 100 and a digital memory 112 in operable communication with the processor. A collection of scored-tuples 502 resides in the digital memory. Each scored-tuple includes an accessor ID 202 and a storage item ID 210 and a recommendation score 504 corresponding to a storage access attempt. Each accessor ID is associated with a user 104 who made the storage access attempt, and each storage item ID identifies a storage item 208 targeted by the storage access attempt. A tuple-to-score 506 resides in the digital memory, includes an accessor ID and a storage item ID, and has a space 508 allocated to hold a recommendation score which has not yet been assigned to the tuple-to-score. This accessor ID is associated with a user (not necessarily the same user as for other tuples), and this storage item ID identifies a storage item. The system 500 also includes a recommender 510 residing at least partially in the digital memory, which upon execution by the processor performs a process that includes (a) collaboratively filtering a plurality of the scored-tuples, thereby (b) computing a recommendation score usable as an inverse measure of intrusion risk.

In some embodiments, the accessor ID 202 includes at least one of the following: a router IP address 302, a firewall IP address 302, or a proxy server IP address 302 as a source IP address.

In some embodiments, which may conform with the example in FIG. 6, the following conditions are met: the system 500 includes a first subset of scored-tuples which includes a first subset of accessor IDs and a first subset of storage item IDs; the system 500 includes a second subset of scored-tuples which includes a second subset of accessor IDs and a second subset of storage item IDs; the first subset of accessor IDs does not overlap the second subset of accessor IDs; the first subset of storage item IDs does not overlap the second subset of storage item IDs; a first average recommendation score 602 of the first set of scored-tuples is above a specified access-allowable threshold; a second average recommendation score 602 of the second set of scored-tuples is also above the access-allowable threshold; the tuple-to-score accessor ID is in the first set of scored-tuples; the tuple-to-score storage item ID is in the second set of scored-tuples; and the computed recommendation score of the tuple-to-score is below the access-allowable threshold, indicating an unrecommended access 604.

In some embodiments, the recommender 510 resides in and is configured to operatively communicate 938 with at least one of the following: a cloud service 516, a cloud infrastructure 402, a virtual machine 518.

Figure 9:
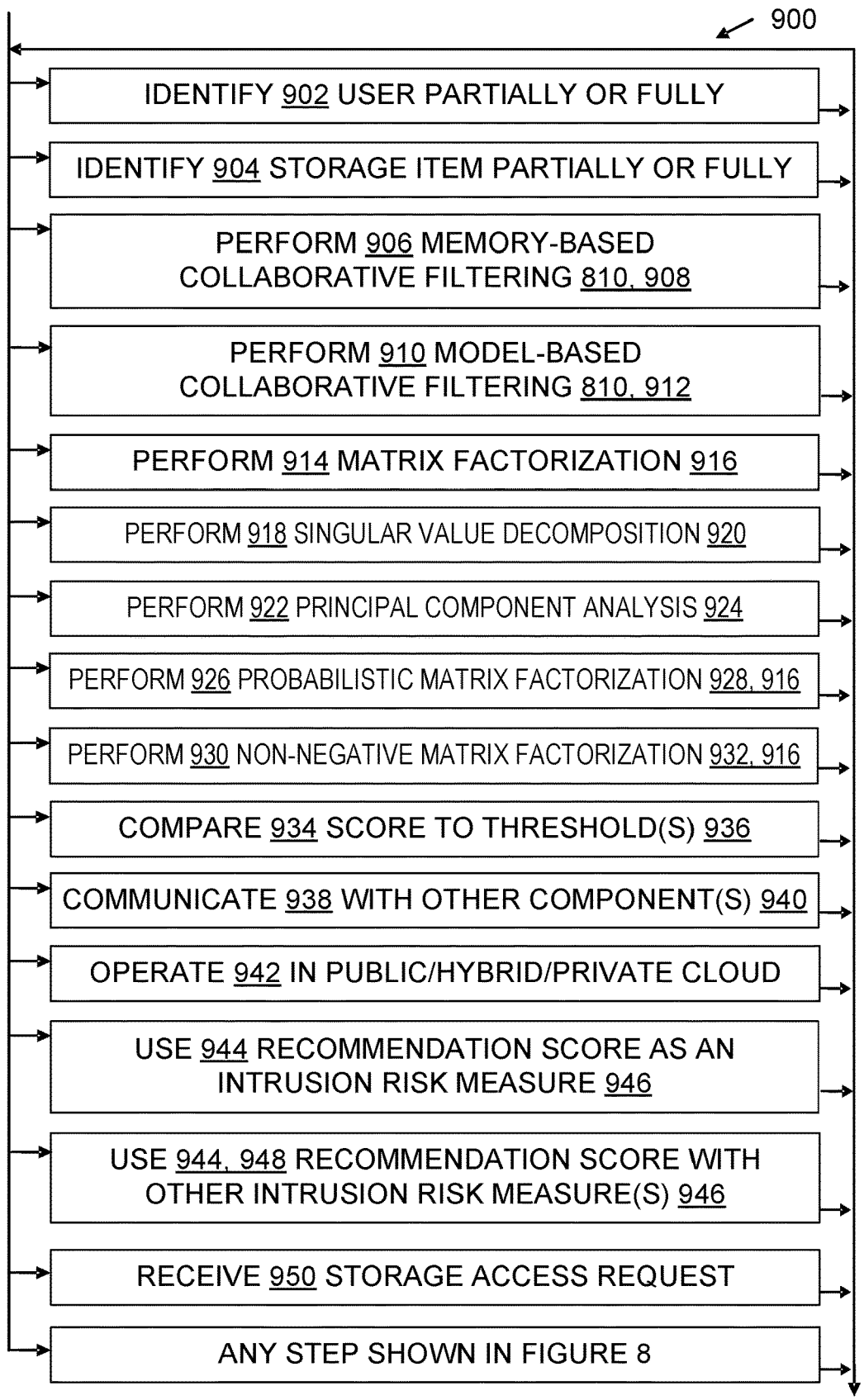
FIG. 9 is a flowchart further illustrating steps in some cybersecurity methods.

With reference to FIGS. 5 and 9, in some embodiments the recommender 510 includes code 512 configured to upon execution perform at least one of the following: a singular value decomposition 920, a principal component analysis 924, a probabilistic matrix factorization 928, or a non-negative matrix factorization 932. Thus, the recommender may leverage existing libraries for singular value decomposition, principal component analysis, or matrix factorization, by executing them as part of an intrusion risk analysis instead of their familiar use in producing a product or service purchase recommendation. In some embodiments, the system includes a sparse matrix 514 of accessor IDs and storage item IDs. Libraries for processing a sparse matrix during collaborative filtering may then also be leveraged for use in intrusion detection.

Methods

Figure 8:
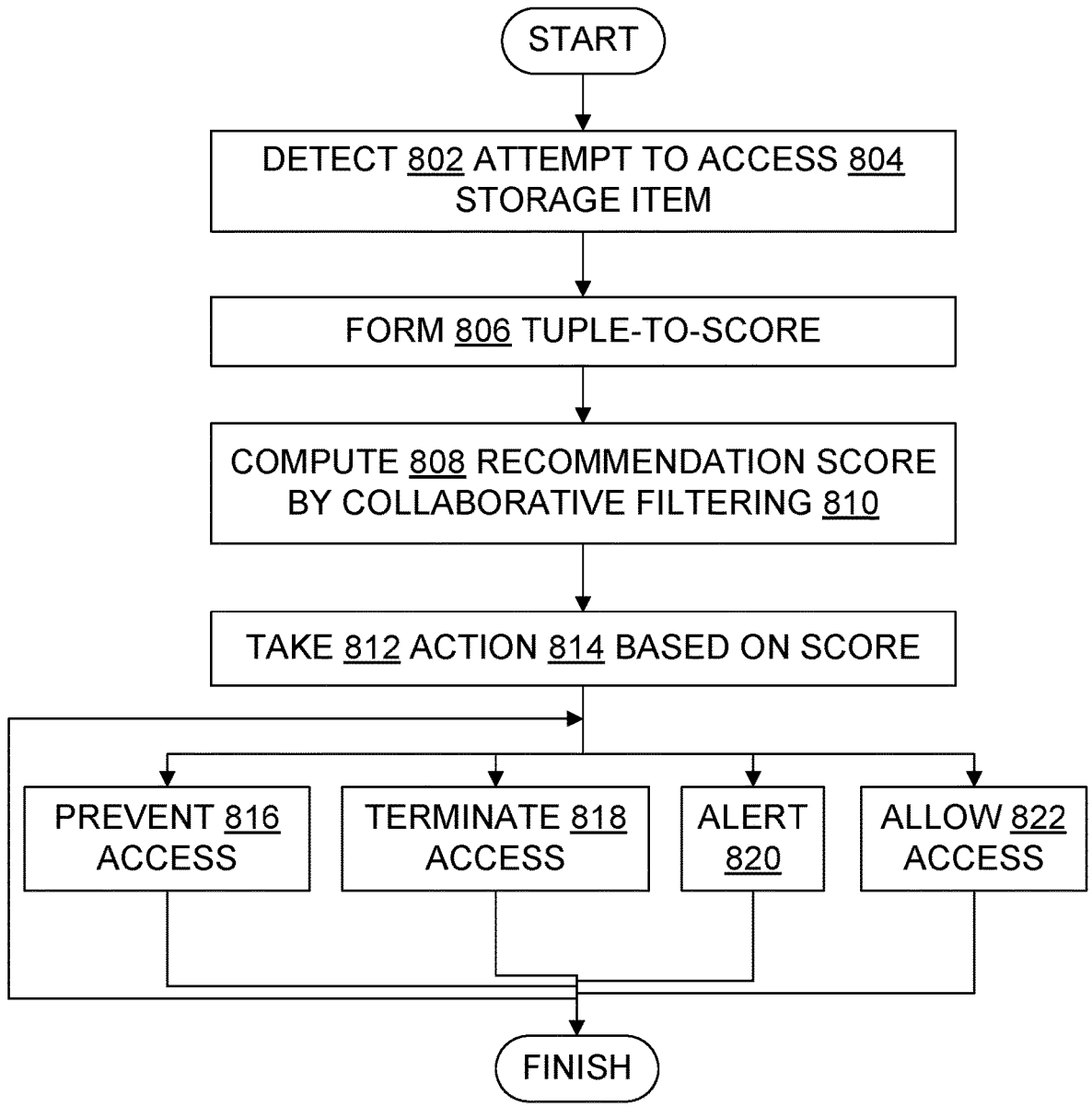
FIG. 8 is a flowchart illustrating example cybersecurity methods.

FIG. 8 illustrates a method 800 which is an example of methods performed or assisted by a recommender 510. This method includes detecting 802 an attempt to access 804 a storage item, e.g., by funneling access attempts through a service 516, or through a firewall or IDS or IPS system 500. Then a tuple-to-score is formed 806, e.g., by extracting the storage item ID and accessor ID from the request 714 and placing them in a tuple 506 data structure. Next, the method computes 808 a recommendation score by collaborative filtering 810, e.g., as described herein using other tuples 502 and by using leveraged implementations of familiar collaborative filtering libraries. Then the system 500 or related components 516, 402, 518 performing the method 800 take 812 some action 814 based on the recommendation score, or equivalently based on a corresponding intrusion risk rating which behaves inversely to the recommendation score. Some possible actions 814 include preventing 816 access to the storage item identified in the request, terminating 818 an access-in-progress to the storage item identified in the request, alerting 820 an administrator (which may be a person or a monitoring task implemented as hardware and software), or actively allowing 822 the access after comparison of the recommendation score to pertinent threshold (s).

FIG. 9 further illustrates some method embodiments in a general flowchart 900. Technical methods shown in the Figures or otherwise disclosed will be performed automatically, e.g., by cybersecurity system 500, unless otherwise indicated. Methods may also be performed in part automatically and in part manually to the extent action by a human administrator or other human person is implicated, e.g., a person may set thresholds 936 that determine which action 814 is taken. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIG. 9. Steps may be performed serially, in a partially overlapping manner, or fully in parallel. The order in which flowchart 900 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Some embodiments use or provide a computer-implemented process for providing cybersecurity by automatically scoring a storage item access attempt with respect to intrusion risk. This process includes automatically forming 806 a tuple-to-score, in response to an attempt by a user to access a storage item. The tuple-to-score includes an accessor ID and a storage item ID. The accessor ID is associated with the user (i.e., it identifies 902 the user partially or fully), and the storage item ID identifies 904 the storage item relative to other storage items.

This process also includes automatically computing 808 a recommendation score at least in part by collaboratively filtering 810 a plurality of scored-tuples. Each scored-tuple includes (a) an accessor ID which differs from the accessor ID of the tuple-to-score, (b) a storage item ID which matches the storage item ID of the tuple-to-score, and (c) a recommendation score corresponding to the scored-tuple's accessor ID and storage item ID.

This process also includes automatically taking 812 at least one of the following actions based at least in part on the computed recommendation score, thereby using the recommendation score as an inverse measure of intrusion risk: preventing 816 or terminating 818 access to the storage item by the user when the computed recommendation score is lower than a specified access-prevention threshold; alerting 820 an administrator or a security monitoring task to the access to the storage item by the user when the computed recommendation score is lower than a specified access-alert threshold; or allowing 822 the user to access the storage item when the computed recommendation score is above a specified access-allowable threshold. Allowing 822 includes by implication a comparison 934 of the computed recommendation score to a threshold 936; allowance 822 is intentionally a positively recited active step which is informed by and dependent upon the computed recommendation score.

In some embodiments, the accessor ID 202 includes at least one of the following identifiers: a source IP address, a source port number, a username, a user agent ID, a user group ID, a user role ID, a user account ID. In some, the accessor ID includes at least two of these listed identifiers. In some, the accessor ID uniquely identifies the user relative to all users who have sufficient permissions to access the storage item, while in others the user is only partially identified 902 by the accessor ID.

In some embodiments, the storage item identifies 904 one of the following storage items: a file, an object, a blob, a block, a log, a container, a database table, or a queue.

In some embodiments, computing 808 a recommendation score includes performing 906 a memory-based collaborative filtering 908. Those of skill in the collaborative filtering art will understand that in the present context memory-based collaborative filtering uses rating data from accessor IDs to compute the similarity of accessors or accessor IDs, the similarity of storage items, or both. For instance, locality-sensitive hashing may be used to measure accessor similarity.

In some embodiments, computing 808 a recommendation score includes performing 910 a model-based collaborative filtering 912. Those of skill in the collaborative filtering art will understand that in the present context model-based collaborative filtering uses techniques and tools such as data mining, machine learning, Bayesian networks, clustering models, and Markov decision process models to predict recommendation scores. Model-based approaches may perform 918 singular value decomposition 920, or perform 922 principal component analysis 924, for example. Some embodiments perform 914, 926, 930 some form of matrix factorization 916. Also, some embodiments use a combination of memory-based collaborative filtering 908 and model-based collaborative filtering 912, e.g., by averaging scores 504 from each.

Some embodiments use or provide a computer-implemented process performed in a cloud 400 for providing cybersecurity by automatically scoring a storage item access attempt with respect to intrusion risk. This process includes automatically forming 806 a tuple-to-score in response to an attempt to access a storage item which is stored in the cloud. The tuple-to-score includes an accessor ID and a storage item ID. The storage item ID identifies the storage item relative to other storage items.

This process also includes automatically computing 808 a recommendation score at least in part by collaboratively filtering 810 a plurality of scored-tuples. Each scored-tuple includes (a) an accessor ID which differs from the accessor ID of the tuple-to-score, (b) a storage item ID which matches the storage item ID of the tuple-to-score, and (c) a recommendation score corresponding to the scored-tuple's accessor ID and storage item ID.

This process also includes automatically taking 812 at least one of the following actions 814 based at least in part on the computed recommendation score, thereby using 944 the recommendation score as an inverse measure of intrusion risk 946: preventing 816 or terminating 818 access to the storage item via the accessor ID when the computed recommendation score is lower than a specified access-prevention threshold; alerting 820 an administrator or a security monitoring task to the access to the storage item when the computed recommendation score is lower than a specified access-alert threshold; or allowing 822 the attempted access the storage item when the computed recommendation score is above a specified access-allowable threshold.

In some embodiments, the attempt to access the storage item stored in the cloud includes at least one of the following: a cloud-based queue storage service receiving 950 an access request to access a queue; a cloud-based database service receiving 950 an access request to access a database table; a cloud-based blob storage service receiving 950 an access request to access a blob; a cloud-based file storage service receiving 950 an access request to access a file.

In some embodiments, computing 808 a recommendation score includes performing 910 a model-based collaborative filtering based at least in part on other attempts to access the storage item. In some of these, the attempt to access the storage item stored in the cloud includes at least one of the following: a public cloud storage service receiving 950 an access request to access the storage item; a hybrid public-private cloud storage service receiving 950 an access request to access the storage item.

In some embodiments, the process computes 808 a recommendation score of less than 0.15 on a scale where the threshold 936 value 0.0 represents entirely abnormal behavior and the threshold 936 value 1.0 represents entirely normal behavior. Equivalently, the process may compute 808 a low recommendation score on another scale, e.g., from one to ten, or a scale from zero to one hundred. In some embodiments, the one or more actions 814 which are taken 812 based at least in part on the computed recommendation score exclude the action of allowing 822 the attempted access.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as collaborative filtering code 512, scored-tuples 502, tuples-to-score 506, and recommendation scores 504, in the form of data 118 and instructions 116, read from a removable medium 114 and/or another source such as a network connection, to form a configured medium. The configured medium 112 is capable of causing a computer system to perform technical process steps for enhancing cybersecurity by identifying possible intrusions or threatened intrusions to storage 206 as disclosed herein. The Figures thus help illustrate configured storage media embodiments and process embodiments, as well as system and process embodiments. In particular, any of the process steps illustrated in FIG. 8, FIG. 9, or otherwise taught herein, may be used to help configure a storage medium to form a configured medium embodiment.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 8 and 9 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A cybersecurity configured system, with storage item access attempt intrusion risk scoring configured for providing cybersecurity, the system comprising:
   at least one processor;
   a digital memory in operable communication with the processor;
   a collection of scored-tuples, residing in the digital memory, each scored-tuple including a scored-tuple accessor ID and a scored-tuple storage item ID and a scored-tuple anomaly score corresponding to a storage access attempt, each scored-tuple accessor ID associated with a user who made the storage access attempt and each scored-tuple storage item ID identifying a scored-tuple storage item targeted by the storage access attempt;
   a tuple-to-score, residing in the digital memory, including a tuple-to-score accessor ID and a tuple-to-score storage item ID, and having a space allocated to hold a tuple-to-score anomaly score which has not yet been assigned to the tuple-to-score, the tuple-to-score storage item ID identifying a tuple-to-score storage item; and
   a risk assessment mechanism, residing at least partially in the digital memory, which upon execution by the processor performs a process that includes (a) collaboratively filtering a plurality of the scored-tuples, thereby (b) computing a collaborative filtering anomaly score usable as an inverse measure of intrusion risk.

2. The cybersecurity configured system of claim 1, wherein the following conditions are met:
   the system includes a first subset of scored-tuples which includes a first subset of scored-tuple accessor IDs and a first subset of scored-tuple storage item IDs;
   the system includes a second subset of scored-tuples which includes a second subset of scored-tuple accessor IDs and a second subset of scored-tuple storage item IDs;
   the first subset of scored-tuple accessor IDs does not overlap the second subset of scored-tuple accessor IDs;
   the first subset of scored-tuple storage item IDs does not overlap the second subset of scored-tuple storage item IDs;
   a first average scored-tuple anomaly score of the first set of scored-tuples is above a specified access-allowable threshold;
   a second average scored-tuple anomaly score of the second set of scored-tuples is also above the access-allowable threshold;
   the tuple-to-score accessor ID is in the first set of scored-tuples;
   the tuple-to-score storage item ID is in the second set of scored-tuples; and
   the computed collaborative filtering anomaly score of the tuple-to-score is below the access-allowable threshold.

3. The cybersecurity configured system of claim 1, wherein the risk assessment mechanism resides in and is configured to operatively communicate with at least one of the following: a cloud service, a cloud infrastructure, a virtual machine.

4. The cybersecurity configured system of claim 1, wherein the risk assessment mechanism comprises code configured to upon execution perform at least one of the following: a singular value decomposition, a principal component analysis, a probabilistic matrix factorization, or a non-negative matrix factorization.

5. The cybersecurity configured system of claim 1, wherein at least one scored-tuple accessor ID comprises at least one of the following: a router IP address, a firewall IP address, or a proxy server IP address.

6. The cybersecurity configured system of claim 1, wherein the system comprises a sparse matrix of scored-tuple accessor IDs and scored-tuple storage item IDs.

7. A process for providing cybersecurity by automatically scoring a storage item access attempt with respect to intrusion risk, the process comprising:
   automatically forming a tuple-to-score, in response to an attempt by a user to access a storage item, the tuple-to-score including a tuple-to-score accessor ID and a tuple-to-score storage item ID, the tuple-to-score accessor ID associated with the user and the tuple-to-score storage item ID identifying the storage item relative to other storage items;
   automatically computing a collaborative filtering anomaly score at least in part by collaboratively filtering a plurality of scored-tuples, each scored-tuple including (a) a scored-tuple accessor ID which differs from the tuple-to-score accessor ID, (b) a scored-tuple storage item ID which matches the tuple-to-score storage item ID, and (c) a scored-tuple anomaly score corresponding to the scored-tuple accessor ID and scored-tuple storage item ID; and
   automatically taking at least one of the following actions based at least in part on the computed collaborative filtering anomaly score, thereby using the collaborative filtering anomaly score as an inverse measure of intrusion risk:
   preventing or terminating access to the storage item by the user when the computed collaborative filtering anomaly score is lower than a specified access-prevention threshold;
   alerting an administrator or a security monitoring task to the access to the storage item by the user when the computed collaborative filtering anomaly score is lower than a specified access-alert threshold; or
   allowing the user to access the storage item when the computed collaborative filtering anomaly score is above a specified access-allowable threshold.

8. The process of claim 7, wherein at least one scored-tuple accessor ID includes at least one of the following identifiers: a source IP address, a source port number, a username, a user agent ID, a user group ID, a user role ID, a user account ID.

9. The process of claim 8, wherein the at least one scored-tuple accessor ID includes at least two of the listed identifiers.

10. The process of claim 7, wherein at least one scored-tuple accessor ID uniquely identifies the user relative to all users who have sufficient permissions to access the storage item.

11. The process of claim 7, wherein at least one scored-tuple storage item ID identifies one of the following storage items: a file, an object, a blob, a block, a log, a container, a database table, or a queue.

12. The process of claim 7, wherein computing the collaborative filtering anomaly score comprises performing a memory-based collaborative filtering.

13. The process of claim 7, wherein computing the collaborative filtering anomaly score comprises performing a model-based collaborative filtering.

14. The process of claim 7, wherein computing the collaborative filtering anomaly score comprises performing a matrix factorization.

15. The process of claim 7, wherein computing the collaborative filtering anomaly score comprises performing at least one of the following: a singular value decomposition, a principal component analysis, a probabilistic matrix factorization, or a non-negative matrix factorization.

16. A process performed in a cloud for providing cybersecurity by automatically scoring a storage item access attempt with respect to intrusion risk, the process comprising:
   automatically forming a tuple-to-score in response to an attempt to access a storage item which is stored in the cloud, the tuple-to-score including a tuple-to-score accessor ID and a tuple-to-score storage item ID, the tuple-to-score storage item ID identifying the storage item relative to other storage items;
   automatically computing a collaborative filtering anomaly score at least in part by collaboratively filtering a plurality of scored-tuples, each scored-tuple including (a) a scored-tuple accessor ID which differs from the tuple-to-score accessor ID, (b) a scored-tuple storage item ID which matches the tuple-to-score storage item ID, and (c) a scored-tuple anomaly score corresponding to the scored-tuple accessor ID and scored-tuple storage item ID; and
   automatically taking at least one of the following actions based at least in part on the computed collaborative filtering anomaly score, thereby using the collaborative filtering anomaly score as an inverse measure of intrusion risk:
      preventing or terminating access to the storage item via the tuple-to-score accessor ID when the computed collaborative filtering anomaly score is lower than a specified access-prevention threshold;
      alerting an administrator or a security monitoring task to the access to the storage item when the computed collaborative filtering anomaly score is lower than a specified access-alert threshold; or
      allowing the attempted access the storage item when the computed collaborative filtering anomaly score is above a specified access-allowable threshold.

17. The process of claim 16, wherein the attempt to access the storage item stored in the cloud comprises at least one of the following:
   a cloud-based queue storage service receiving an access request to access a queue;
   a cloud-based database service receiving an access request to access a database table;
   a cloud-based blob storage service receiving an access request to access a blob;
   a cloud-based file storage service receiving an access request to access a file.

18. The process of claim 16, wherein computing the collaborative filtering anomaly score comprises performing a model-based collaborative filtering based at least in part on other attempts to access the storage item.

19. The process of claim 16, wherein the attempt to access the storage item stored in the cloud comprises at least one of the following:
   a public cloud storage service receiving an access request to access the storage item;
   a hybrid public-private cloud storage service receiving an access request to access the storage item.

20. The process of claim 16, wherein the collaborative filtering anomaly score is less than 0.15 on a scale where 0.0 represents entirely abnormal behavior and 1.0 represents entirely normal behavior, or an equivalently low collaborative filtering anomaly score on another scale, and wherein the one or more actions which are taken based at least in part on the computed collaborative filtering anomaly score exclude allowing the attempted access.

* * * * *